(12) United States Patent
Svendsen et al.

(10) Patent No.: US 8,396,951 B2
(45) Date of Patent: Mar. 12, 2013

(54) METHOD AND SYSTEM FOR POPULATING A CONTENT REPOSITORY FOR AN INTERNET RADIO SERVICE BASED ON A RECOMMENDATION NETWORK

(75) Inventors: Hugh Svendsen, Chapel Hill, NC (US); Eugene M. Farrelly, Cary, NC (US)

(73) Assignee: Napo Enterprises, LLC, Portsmouth, NH (US)

( * ) Notice: Subject to any disclaimer, the term of this patent is extended or adjusted under 35 U.S.C. 154(b) by 964 days.

(21) Appl. No.: 11/961,105

(22) Filed: Dec. 20, 2007

(65) Prior Publication Data

US 2009/0164514 A1  Jun. 25, 2009

(51) Int. Cl.
*G06F 15/16* (2006.01)
(52) U.S. Cl. ........ 709/223; 709/231; 709/238; 709/239; 706/16; 706/47
(58) Field of Classification Search ............ 706/16, 706/47; 713/168, 176; 455/414.1; 709/231, 709/238, 239, 242, 223; 731/168, 176
See application file for complete search history.

(56) References Cited

U.S. PATENT DOCUMENTS

| | | |
|---|---|---|
| 4,870,579 A | 9/1989 | Hey |
| 5,621,456 A | 4/1997 | Florin et al. |
| 5,724,567 A | 3/1998 | Rose et al. |
| 5,771,778 A | 6/1998 | MacLean, IV |
| 5,956,027 A | 9/1999 | Krishnamurthy |
| 5,960,437 A | 9/1999 | Krawchuk et al. |
| 5,963,916 A | 10/1999 | Kaplan |
| 6,134,552 A | 10/2000 | Fritz et al. |
| 6,195,657 B1 | 2/2001 | Rucker et al. |
| 6,266,649 B1 | 7/2001 | Linden et al. |
| 6,314,420 B1 | 11/2001 | Lang et al. |
| 6,317,722 B1 | 11/2001 | Jacobi et al. |
| 6,353,823 B1 | 3/2002 | Kumar |
| 6,388,714 B1 | 5/2002 | Schein et al. |
| 6,438,579 B1 | 8/2002 | Hosken |
| 6,498,955 B1 | 12/2002 | McCarthy et al. |
| 6,526,411 B1 | 2/2003 | Ward |
| 6,567,797 B1 | 5/2003 | Schuetze et al. |
| 6,587,127 B1 | 7/2003 | Leeke et al. |
| 6,587,850 B2 | 7/2003 | Zhai |

(Continued)

FOREIGN PATENT DOCUMENTS

| | | |
|---|---|---|
| CN | 1208930 A | 2/1999 |
| CN | 1614931 A | 5/2005 |

(Continued)

OTHER PUBLICATIONS

Last.fm, From Wikipedia, the free encyclopedia, http://en.wikipedia.org/wiki/Last.fm, pp. 1-12, Aug. 31, 2007.

(Continued)

*Primary Examiner* — Andrew Chriss
*Assistant Examiner* — Mohamed Kamara

(57) ABSTRACT

A computer-implemented method and system are provided for populating the content repository of the media service based on real-time media recommendation network comprising a plurality of peer devices. Aspects of the method and system include receiving by a server a recommendation from one of the plurality of peer devices for a media item that is intended for a recipient; determining if the media item is present in the content repository; in response to determining that the media item is not present in the content repository, requesting that the peer device upload the media item; and in response to the media item being uploaded, storing the media item in the content repository.

20 Claims, 6 Drawing Sheets

U.S. PATENT DOCUMENTS

| | | |
|---|---|---|
| 6,609,253 B1 | 8/2003 | Swix et al. |
| 6,615,208 B1 | 9/2003 | Behrens et al. |
| 6,629,104 B1 | 9/2003 | Parulski et al. |
| 6,636,836 B1 | 10/2003 | Pyo |
| 6,654,786 B1 | 11/2003 | Fox et al. |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,754,904 B1 | 6/2004 | Cooper et al. |
| 6,757,517 B2 | 6/2004 | Chang |
| 6,757,691 B1 | 6/2004 | Welsh et al. |
| 6,801,909 B2 | 10/2004 | Delgado et al. |
| 6,865,565 B2 | 3/2005 | Rainsberger et al. |
| 6,904,264 B1 | 6/2005 | Frantz |
| 6,912,528 B2 | 6/2005 | Homer |
| 6,941,275 B1 | 9/2005 | Swierczek |
| 6,941,324 B2 | 9/2005 | Plastina et al. |
| 6,947,922 B1 | 9/2005 | Glance |
| 6,973,475 B2 | 12/2005 | Kenyon et al. |
| 6,976,228 B2 | 12/2005 | Bernhardson |
| 6,986,136 B2 | 1/2006 | Simpson et al. |
| 6,987,221 B1 | 1/2006 | Platt |
| 6,990,453 B2 | 1/2006 | Wang et al. |
| 7,013,301 B2 | 3/2006 | Holm et al. |
| 7,035,871 B2 | 4/2006 | Hunt et al. |
| 7,047,406 B2 * | 5/2006 | Schleicher et al. ........... 713/168 |
| 7,072,846 B1 | 7/2006 | Robinson |
| 7,072,886 B2 | 7/2006 | Salmenkaita et al. |
| 7,075,000 B2 | 7/2006 | Gang et al. |
| 7,076,553 B2 | 7/2006 | Chan et al. |
| 7,085,747 B2 | 8/2006 | Schaffer et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,145,678 B2 | 12/2006 | Simpson et al. |
| 7,146,627 B1 | 12/2006 | Ismail et al. |
| 7,171,174 B2 | 1/2007 | Ellis et al. |
| 7,177,872 B2 | 2/2007 | Schwesig et al. |
| 7,219,145 B2 | 5/2007 | Chmaytelli et al. |
| 7,222,187 B2 | 5/2007 | Yeager et al. |
| 7,240,358 B2 | 7/2007 | Horn et al. |
| 7,277,955 B2 | 10/2007 | Elliott |
| 7,283,992 B2 | 10/2007 | Liu et al. |
| 7,296,032 B1 | 11/2007 | Beddow |
| 7,305,449 B2 | 12/2007 | Simpson et al. |
| 7,340,481 B1 | 3/2008 | Baer et al. |
| 7,356,187 B2 | 4/2008 | Shanahan et al. |
| 7,437,364 B1 | 10/2008 | Fredricksen et al. |
| 7,441,041 B2 | 10/2008 | Williams et al. |
| 7,444,339 B2 | 10/2008 | Matsuda et al. |
| 7,457,790 B2 | 11/2008 | Kochunni et al. |
| 7,463,890 B2 | 12/2008 | Herz et al. |
| 7,469,283 B2 | 12/2008 | Eyal et al. |
| 7,496,623 B2 | 2/2009 | Szeto et al. |
| 7,509,291 B2 | 3/2009 | McBride et al. |
| 7,512,658 B2 | 3/2009 | Brown et al. |
| 7,523,156 B2 | 4/2009 | Giacalone, Jr. |
| 7,548,915 B2 | 6/2009 | Ramer et al. |
| 7,590,546 B2 | 9/2009 | Chuang |
| 7,594,246 B1 | 9/2009 | Billmaier et al. |
| 7,614,006 B2 | 11/2009 | Molander |
| 7,623,843 B2 | 11/2009 | Squibbs |
| 7,627,644 B2 | 12/2009 | Slack-Smith |
| 7,644,166 B2 | 1/2010 | Appelman et al. |
| 7,653,654 B1 | 1/2010 | Sundaresan |
| 7,676,753 B2 | 3/2010 | Bedingfield |
| 7,680,959 B2 | 3/2010 | Svendsen |
| 7,720,871 B2 | 5/2010 | Rogers et al. |
| 7,725,494 B2 | 5/2010 | Rogers et al. |
| 7,734,569 B2 | 6/2010 | Martin et al. |
| 7,751,773 B2 | 7/2010 | Linden |
| 7,761,399 B2 | 7/2010 | Evans |
| 7,765,192 B2 | 7/2010 | Svendsen |
| 7,783,777 B1 * | 8/2010 | Pabla et al. ................... 709/238 |
| 7,804,016 B2 | 9/2010 | Sagoo et al. |
| 7,805,129 B1 | 9/2010 | Issa et al. |
| 7,827,110 B1 | 11/2010 | Wieder |
| 7,865,522 B2 | 1/2011 | Purdy et al. |
| 7,877,387 B2 | 1/2011 | Hangartner |
| 7,970,922 B2 | 6/2011 | Svendsen |
| 8,059,646 B2 | 11/2011 | Svendsen et al. |
| 8,200,602 B2 | 6/2012 | Farrelly |
| 2001/0013009 A1 | 8/2001 | Greening et al. |
| 2001/0021914 A1 | 9/2001 | Jacobi et al. |
| 2001/0025259 A1 * | 9/2001 | Rouchon ........................ 705/26 |
| 2002/0052207 A1 | 5/2002 | Hunzinger |
| 2002/0052674 A1 | 5/2002 | Chang et al. |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0108112 A1 | 8/2002 | Wallace et al. |
| 2002/0116533 A1 | 8/2002 | Holliman et al. |
| 2002/0138836 A1 | 9/2002 | Zimmerman |
| 2002/0165793 A1 | 11/2002 | Brand et al. |
| 2002/0178057 A1 | 11/2002 | Bertram et al. |
| 2002/0194325 A1 | 12/2002 | Chmaytelli et al. |
| 2002/0194356 A1 | 12/2002 | Chan et al. |
| 2003/0001907 A1 | 1/2003 | Bergsten et al. |
| 2003/0005074 A1 | 1/2003 | Herz et al. |
| 2003/0014407 A1 | 1/2003 | Blatter et al. |
| 2003/0018799 A1 | 1/2003 | Eyal |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0069806 A1 | 4/2003 | Konomi et al. |
| 2003/0084044 A1 | 5/2003 | Simpson et al. |
| 2003/0084086 A1 | 5/2003 | Simpson et al. |
| 2003/0084151 A1 | 5/2003 | Simpson et al. |
| 2003/0089218 A1 | 5/2003 | Gang et al. |
| 2003/0097186 A1 | 5/2003 | Gutta et al. |
| 2003/0115167 A1 | 6/2003 | Sharif et al. |
| 2003/0135513 A1 | 7/2003 | Quinn et al. |
| 2003/0137531 A1 | 7/2003 | Katinsky et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1 | 10/2003 | Hoch |
| 2003/0227478 A1 | 12/2003 | Chatfield |
| 2003/0229537 A1 | 12/2003 | Dunning et al. |
| 2003/0232614 A1 | 12/2003 | Squibbs |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019497 A1 | 1/2004 | Volk et al. |
| 2004/0034441 A1 | 2/2004 | Eaton et al. |
| 2004/0073919 A1 | 4/2004 | Gutta et al. |
| 2004/0088271 A1 | 5/2004 | Cleckler |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0137882 A1 | 7/2004 | Forsyth |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0260778 A1 | 12/2004 | Banister et al. |
| 2004/0267604 A1 | 12/2004 | Gross |
| 2005/0020223 A1 | 1/2005 | Ellis et al. |
| 2005/0021420 A1 | 1/2005 | Michelitsch et al. |
| 2005/0021470 A1 | 1/2005 | Martin et al. |
| 2005/0021678 A1 | 1/2005 | Simyon et al. |
| 2005/0022239 A1 | 1/2005 | Meuleman |
| 2005/0026559 A1 | 2/2005 | Khedouri |
| 2005/0038819 A1 | 2/2005 | Hicken et al. |

| | | | | | | |
|---|---|---|---|---|---|---|
| 2005/0038876 A1 | 2/2005 | Chaudhuri | | 2006/0282856 A1 | 12/2006 | Errico et al. |
| 2005/0060264 A1 | 3/2005 | Schrock et al. | | 2006/0288041 A1 | 12/2006 | Plastina et al. |
| 2005/0060350 A1 | 3/2005 | Baum et al. | | 2006/0288074 A1 | 12/2006 | Rosenberg |
| 2005/0060666 A1 | 3/2005 | Hoshino et al. | | 2006/0293909 A1 | 12/2006 | Miyajima et al. |
| 2005/0065976 A1 | 3/2005 | Holm et al. | | 2007/0005793 A1 | 1/2007 | Miyoshi et al. |
| 2005/0091107 A1 | 4/2005 | Blum | | 2007/0008927 A1 | 1/2007 | Herz et al. |
| 2005/0120053 A1 | 6/2005 | Watson | | 2007/0014536 A1 | 1/2007 | Hellman |
| 2005/0125221 A1 | 6/2005 | Brown et al. | | 2007/0022437 A1 | 1/2007 | Gerken |
| 2005/0125222 A1 | 6/2005 | Brown et al. | | 2007/0028171 A1 | 2/2007 | MacLaurin |
| 2005/0131866 A1 | 6/2005 | Badros | | 2007/0033292 A1 | 2/2007 | Sull et al. |
| 2005/0138198 A1 | 6/2005 | May | | 2007/0043766 A1 | 2/2007 | Nicholas et al. |
| 2005/0154608 A1 | 7/2005 | Paulson et al. | | 2007/0044010 A1 | 2/2007 | Sull et al. |
| 2005/0154764 A1 | 7/2005 | Riegler et al. | | 2007/0064626 A1 | 3/2007 | Evans |
| 2005/0154767 A1 | 7/2005 | Sako | | 2007/0078714 A1 | 4/2007 | Ott, IV et al. |
| 2005/0158028 A1 | 7/2005 | Koba | | 2007/0078832 A1 | 4/2007 | Ott, IV et al. |
| 2005/0166245 A1 | 7/2005 | Shin et al. | | 2007/0079352 A1 | 4/2007 | Klein, Jr. |
| 2005/0197961 A1 | 9/2005 | Miller et al. | | 2007/0083471 A1 | 4/2007 | Robbin et al. |
| 2005/0228830 A1 | 10/2005 | Plastina et al. | | 2007/0083553 A1 | 4/2007 | Minor |
| 2005/0246391 A1 | 11/2005 | Gross | | 2007/0083929 A1 | 4/2007 | Sprosts et al. |
| 2005/0251455 A1 | 11/2005 | Boesen | | 2007/0094081 A1 | 4/2007 | Yruski et al. |
| 2005/0251807 A1 | 11/2005 | Weel | | 2007/0094082 A1 | 4/2007 | Yruski et al. |
| 2005/0256756 A1 | 11/2005 | Lam et al. | | 2007/0094083 A1 | 4/2007 | Yruski et al. |
| 2005/0256866 A1 | 11/2005 | Lu et al. | | 2007/0094363 A1 | 4/2007 | Yruski et al. |
| 2005/0267944 A1 | 12/2005 | Little, II | | 2007/0100904 A1 | 5/2007 | Casey et al. |
| 2005/0278377 A1 | 12/2005 | Mirrashidi et al. | | 2007/0104138 A1 | 5/2007 | Rudolf et al. |
| 2005/0278758 A1 | 12/2005 | Bodlaender | | 2007/0106672 A1 | 5/2007 | Sighart et al. |
| 2005/0286546 A1 | 12/2005 | Bassoli et al. | | 2007/0106693 A1 | 5/2007 | Houh et al. |
| 2005/0289236 A1 | 12/2005 | Hull et al. | | 2007/0118425 A1 | 5/2007 | Yruski et al. |
| 2006/0004640 A1 | 1/2006 | Swierczek | | 2007/0118657 A1 | 5/2007 | Kreitzer et al. |
| 2006/0004704 A1 | 1/2006 | Gross | | 2007/0118802 A1 | 5/2007 | Gerace et al. |
| 2006/0008256 A1 | 1/2006 | Khedouri et al. | | 2007/0118853 A1 | 5/2007 | Kreitzer et al. |
| 2006/0010167 A1 | 1/2006 | Grace et al. | | 2007/0118873 A1 | 5/2007 | Houh et al. |
| 2006/0015378 A1 | 1/2006 | Mirrashidi et al. | | 2007/0130008 A1 | 6/2007 | Brown et al. |
| 2006/0020662 A1 | 1/2006 | Robinson | | 2007/0130012 A1 | 6/2007 | Yruski et al. |
| 2006/0026048 A1 | 2/2006 | Kolawa et al. | | 2007/0152502 A1 | 7/2007 | Kinsey et al. |
| 2006/0048059 A1 | 3/2006 | Etkin | | 2007/0162502 A1 | 7/2007 | Thomas et al. |
| 2006/0053080 A1 | 3/2006 | Edmonson et al. | | 2007/0195373 A1 | 8/2007 | Singh |
| 2006/0064716 A1 | 3/2006 | Sull et al. | | 2007/0198485 A1 | 8/2007 | Ramer et al. |
| 2006/0074750 A1 | 4/2006 | Clark et al. | | 2007/0199014 A1 | 8/2007 | Clark et al. |
| 2006/0083119 A1 | 4/2006 | Hayes | | 2007/0214182 A1 | 9/2007 | Rosenberg |
| 2006/0085383 A1 | 4/2006 | Mantle et al. | | 2007/0214259 A1 | 9/2007 | Ahmed et al. |
| 2006/0100924 A1 | 5/2006 | Tevanian, Jr. | | 2007/0220081 A1 | 9/2007 | Hyman |
| 2006/0126135 A1 | 6/2006 | Stevens et al. | | 2007/0220575 A1 | 9/2007 | Cooper et al. |
| 2006/0130120 A1 | 6/2006 | Brandyberry et al. | | 2007/0233736 A1 | 10/2007 | Xiong et al. |
| 2006/0143236 A1 | 6/2006 | Wu | | 2007/0238427 A1 | 10/2007 | Kraft et al. |
| 2006/0156242 A1 | 7/2006 | Bedingfield | | 2007/0239724 A1 | 10/2007 | Ramer et al. |
| 2006/0167991 A1 | 7/2006 | Heikes et al. | | 2007/0244880 A1 | 10/2007 | Martin et al. |
| 2006/0173910 A1 | 8/2006 | McLaughlin | | 2007/0245245 A1 | 10/2007 | Blue et al. |
| 2006/0174277 A1 | 8/2006 | Sezan et al. | | 2007/0264982 A1* | 11/2007 | Nguyen et al. ............ 455/414.1 |
| 2006/0190616 A1 | 8/2006 | Mayerhofer et al. | | 2007/0265870 A1 | 11/2007 | Song et al. |
| 2006/0195479 A1 | 8/2006 | Spiegelman et al. | | 2007/0269169 A1 | 11/2007 | Stix et al. |
| 2006/0195512 A1 | 8/2006 | Rogers et al. | | 2007/0277202 A1 | 11/2007 | Lin et al. |
| 2006/0195513 A1 | 8/2006 | Rogers et al. | | 2007/0282949 A1 | 12/2007 | Fischer et al. |
| 2006/0195514 A1 | 8/2006 | Rogers et al. | | 2007/0288546 A1 | 12/2007 | Rosenberg |
| 2006/0195515 A1 | 8/2006 | Beaupre et al. | | 2007/0299873 A1 | 12/2007 | Jones et al. |
| 2006/0195516 A1 | 8/2006 | Beaupre | | 2007/0299874 A1 | 12/2007 | Neumann et al. |
| 2006/0195521 A1 | 8/2006 | New et al. | | 2007/0299978 A1 | 12/2007 | Neumann et al. |
| 2006/0195789 A1 | 8/2006 | Rogers et al. | | 2008/0005179 A1 | 1/2008 | Friedman et al. |
| 2006/0195790 A1 | 8/2006 | Beaupre et al. | | 2008/0010372 A1 | 1/2008 | Khedouri et al. |
| 2006/0200432 A1 | 9/2006 | Flinn et al. | | 2008/0016098 A1 | 1/2008 | Frieden et al. |
| 2006/0200435 A1 | 9/2006 | Flinn et al. | | 2008/0016205 A1 | 1/2008 | Svendsen |
| 2006/0206582 A1 | 9/2006 | Finn | | 2008/0032723 A1 | 2/2008 | Rosenberg |
| 2006/0218187 A1 | 9/2006 | Plastina et al. | | 2008/0033959 A1 | 2/2008 | Jones |
| 2006/0224757 A1* | 10/2006 | Fang et al. ............ 709/231 | | 2008/0040313 A1 | 2/2008 | Schachter |
| 2006/0227673 A1 | 10/2006 | Yamashita et al. | | 2008/0046948 A1 | 2/2008 | Verosub |
| 2006/0242201 A1 | 10/2006 | Cobb et al. | | 2008/0052371 A1 | 2/2008 | Partovi et al. |
| 2006/0242206 A1 | 10/2006 | Brezak et al. | | 2008/0052380 A1 | 2/2008 | Morita et al. |
| 2006/0247980 A1 | 11/2006 | Mirrashidi et al. | | 2008/0052630 A1 | 2/2008 | Rosenbaum |
| 2006/0248209 A1 | 11/2006 | Chiu et al. | | 2008/0059422 A1 | 3/2008 | Tenni et al. |
| 2006/0253417 A1 | 11/2006 | Brownrigg et al. | | 2008/0059576 A1 | 3/2008 | Liu et al. |
| 2006/0259355 A1 | 11/2006 | Farouki et al. | | 2008/0085769 A1 | 4/2008 | Lutnick et al. |
| 2006/0265409 A1 | 11/2006 | Neumann et al. | | 2008/0091771 A1 | 4/2008 | Allen et al. |
| 2006/0265503 A1 | 11/2006 | Jones et al. | | 2008/0120501 A1 | 5/2008 | Jannink et al. |
| 2006/0265637 A1 | 11/2006 | Marriott et al. | | 2008/0133601 A1 | 6/2008 | Cervera et al. |
| 2006/0271959 A1 | 11/2006 | Jacoby et al. | | 2008/0133763 A1 | 6/2008 | Clark et al. |
| 2006/0271961 A1 | 11/2006 | Jacoby et al. | | 2008/0134039 A1 | 6/2008 | Fischer et al. |
| 2006/0277098 A1 | 12/2006 | Chung et al. | | 2008/0134043 A1 | 6/2008 | Georgis et al. |
| 2006/0282304 A1 | 12/2006 | Bedard et al. | | 2008/0134053 A1 | 6/2008 | Fischer |
| 2006/0282776 A1 | 12/2006 | Farmer et al. | | 2008/0141136 A1 | 6/2008 | Ozzie et al. |

| | | | |
|---|---|---|---|
| 2008/0147482 A1 | 6/2008 | Messing et al. | |
| 2008/0147711 A1 | 6/2008 | Spiegelman et al. | |
| 2008/0147876 A1 | 6/2008 | Campbell et al. | |
| 2008/0160983 A1 | 7/2008 | Poplett et al. | |
| 2008/0176562 A1 | 7/2008 | Howard | |
| 2008/0178094 A1* | 7/2008 | Ross | 715/741 |
| 2008/0181536 A1 | 7/2008 | Linden | |
| 2008/0189336 A1 | 8/2008 | Prihodko | |
| 2008/0189391 A1 | 8/2008 | Koberstein et al. | |
| 2008/0189655 A1 | 8/2008 | Kol | |
| 2008/0195657 A1 | 8/2008 | Naaman et al. | |
| 2008/0195664 A1 | 8/2008 | Maharajh et al. | |
| 2008/0208823 A1 | 8/2008 | Hicken | |
| 2008/0209013 A1 | 8/2008 | Weel | |
| 2008/0228945 A1 | 9/2008 | Yoon et al. | |
| 2008/0235632 A1 | 9/2008 | Holmes | |
| 2008/0242221 A1 | 10/2008 | Shapiro et al. | |
| 2008/0242280 A1 | 10/2008 | Shapiro et al. | |
| 2008/0243733 A1* | 10/2008 | Black | 706/16 |
| 2008/0244681 A1 | 10/2008 | Gossweiler et al. | |
| 2008/0250067 A1 | 10/2008 | Svendsen | |
| 2008/0250312 A1 | 10/2008 | Curtis | |
| 2008/0270561 A1 | 10/2008 | Tang et al. | |
| 2008/0276279 A1 | 11/2008 | Gossweiler et al. | |
| 2008/0288588 A1 | 11/2008 | Andam et al. | |
| 2008/0301118 A1 | 12/2008 | Chien et al. | |
| 2008/0301186 A1 | 12/2008 | Svendsen | |
| 2008/0301187 A1 | 12/2008 | Svendsen | |
| 2008/0301240 A1 | 12/2008 | Svendsen | |
| 2008/0301241 A1 | 12/2008 | Svendsen | |
| 2008/0306826 A1 | 12/2008 | Kramer et al. | |
| 2008/0307462 A1 | 12/2008 | Beetcher et al. | |
| 2008/0307463 A1 | 12/2008 | Beetcher et al. | |
| 2008/0313541 A1 | 12/2008 | Shafton et al. | |
| 2008/0319833 A1 | 12/2008 | Svendsen | |
| 2009/0006368 A1 | 1/2009 | Mei et al. | |
| 2009/0006374 A1 | 1/2009 | Kim et al. | |
| 2009/0007198 A1 | 1/2009 | Lavender et al. | |
| 2009/0013347 A1 | 1/2009 | Ahanger et al. | |
| 2009/0042545 A1 | 2/2009 | Avital et al. | |
| 2009/0046101 A1 | 2/2009 | Askey et al. | |
| 2009/0048992 A1 | 2/2009 | Svendsen et al. | |
| 2009/0049030 A1 | 2/2009 | Svendsen et al. | |
| 2009/0049045 A1 | 2/2009 | Askey et al. | |
| 2009/0055385 A1 | 2/2009 | Jeon et al. | |
| 2009/0055396 A1 | 2/2009 | Svendsen et al. | |
| 2009/0055467 A1 | 2/2009 | Petersen | |
| 2009/0055759 A1 | 2/2009 | Svendsen | |
| 2009/0069911 A1 | 3/2009 | Stefik | |
| 2009/0069912 A1 | 3/2009 | Stefik | |
| 2009/0070184 A1 | 3/2009 | Svendsen | |
| 2009/0070350 A1 | 3/2009 | Wang | |
| 2009/0076881 A1 | 3/2009 | Svendsen | |
| 2009/0077041 A1 | 3/2009 | Eyal et al. | |
| 2009/0077052 A1 | 3/2009 | Farrelly | |
| 2009/0077084 A1 | 3/2009 | Svendsen | |
| 2009/0077124 A1 | 3/2009 | Spivack et al. | |
| 2009/0077220 A1 | 3/2009 | Svendsen et al. | |
| 2009/0083116 A1 | 3/2009 | Svendsen | |
| 2009/0083117 A1 | 3/2009 | Svendsen et al. | |
| 2009/0083362 A1 | 3/2009 | Svendsen | |
| 2009/0089288 A1 | 4/2009 | Petersen | |
| 2009/0093300 A1 | 4/2009 | Lutnick et al. | |
| 2009/0094248 A1* | 4/2009 | Petersen | 707/10 |
| 2009/0119294 A1 | 5/2009 | Purdy et al. | |
| 2009/0125588 A1 | 5/2009 | Black et al. | |
| 2009/0129671 A1 | 5/2009 | Hu et al. | |
| 2009/0132527 A1 | 5/2009 | Sheshagiri et al. | |
| 2009/0138457 A1 | 5/2009 | Askey | |
| 2009/0138505 A1 | 5/2009 | Purdy | |
| 2009/0157795 A1 | 6/2009 | Black | |
| 2009/0164429 A1 | 6/2009 | Svendsen et al. | |
| 2009/0164641 A1 | 6/2009 | Rogers et al. | |
| 2009/0177301 A1 | 7/2009 | Hayes | |
| 2010/0031366 A1 | 2/2010 | Knight et al. | |
| 2010/0185732 A1 | 7/2010 | Hyman | |
| 2011/0016483 A1 | 1/2011 | Opdycke | |
| 2011/0034121 A1 | 2/2011 | Ng et al. | |

FOREIGN PATENT DOCUMENTS

| | | |
|---|---|---|
| EP | 0898278 A2 | 2/1999 |
| EP | 1536352 A1 | 6/2005 |
| EP | 1835455 A1 | 9/2007 |
| GB | 2372850 A | 9/2002 |
| GB | 2397205 A | 7/2004 |
| JP | 2005321668 | 11/2005 |
| WO | 01/25947 A1 | 4/2001 |
| WO | 0184353 A3 | 11/2001 |
| WO | 0221335 A1 | 3/2002 |
| WO | 2004017178 A2 | 2/2004 |
| WO | 2004043064 A1 | 5/2004 |
| WO | 2005026916 A2 | 3/2005 |
| WO | 2005071571 A1 | 8/2005 |
| WO | 2006/075032 A1 | 7/2006 |
| WO | 2006126135 A2 | 11/2006 |
| WO | 2007/092053 A1 | 8/2007 |

OTHER PUBLICATIONS

"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.

"Instant Messenger—AIM—Instant Message Your Online Buddies for Free—AIM," http://dashboard.aim.com/aim, copyright 2007 AOL LLC, printed Nov. 8, 2007, 6 pages.

"Apple—iPod classic," http://www.apple.com/ipodclassic/, printed Oct. 26, 2007, 1 page.

Babulous :: Keep it loud, http://www.babulous.com/home.jhtml, copyright 2009 Babulous, Inc., printed Mar. 26, 2009, 2 pages.

Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story?track=tothtml, 5 pages.

"betterPropaganda—Free MP3s and music videos.," http:/lwww.betterpropaganda.com/, copyright 2004-2005 betterPropaganda, printed Feb. 7, 2007, 4 pages.

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"Bluetooth.com—Learn," http://www.bluetooth.com/Bluetooth/Learn/, copyright 2007 Bluetooth SIG, Inc., printed Oct. 26, 2007, 1 page.

Cai, Rui et al., "Scalable Music Recommendation by Search," Proc. ACM Multimedia, Augsburg, Germany, Sep. 2007, pp. 1065-1074.

"ChoiceStream Technology Brief, Review of Personalization Technologies: Collaborative Filtering vs. ChoiceStream's Attributized Bayesian Choice Modeling," 13 pages.

"The Classic TV Database—Your Home for Classic TV! —www.classic-tv.com," http://www.classic-tv.com, copyright The Classic TV Database—www.classic-tv.com, printed Feb. 7, 2007, 3 pages.

"Digital Tech Life >> Download of the Week," http://www.digitaltechlife.com/category/download-of-the-week/, printed Feb. 16, 2007, 9 pages.

"MP3 music download website, eMusic," http://www.emusic.com/, copyright 2007 eMusic.com Inc., printed Feb. 7, 2007, 1 page.

"GenieLab::Music Recommendation System," http://web.archive.org/web/20060813000442/http://genielab.com/, copyright 2005 GenieLab, LLC, printed Oct. 26, 2007, 1 page.

"The Daily Barometer—GenieLab.com grants music lovers' wishes," http://media.barometer.orst.edu/home/index.cfm? event=displayArticlePrinterFriendly&uSt . . . , copyright 2007 The Daily Barometer, printed Feb. 16, 2007, 2 pages.

Jennifer Golbeck, "Trust and Nuanced Profile Similarity in Online Social Networks," available from http://www.cs.umd.edu/~golbeck/publications.shtml, 2008, 30 pages.

"Goombah—Preview," http://www.goombah.com/preview.html, printed Jan. 8, 2008, 5 pages.

"Gracenote Playlist," Revised Dec. 29, 2005, 2 pages.

"Gracenote Playlist Plus," Revised Dec. 29, 2005, 2 pages.

"Gracenote," http://www.gracenote.com, printed Feb. 7, 2007, 1 page.

"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.

Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.

"Identifying iPod models," http://support.apple.com/kb/HT1353, printed Feb. 24, 2010, 13 pages.

"IEEE 802.11—Wikipedia, the free encyclopedia," http://en.wikipedia.org/wiki/IEEE_802.11, printed Oct. 26, 2007, 5 pages.

"iLikeTM—Home," http://www.ilike.com/, copyright 2007 iLike, printed May 17, 2007, 2 pages.

"The Internet Movie Database (IMDb)," http://www.imdb.com/, copyright 1990-2007 Internet Movie Database Inc., printed Feb. 7, 2007, 3 pages.

"Apple—iPod + iTunes," http://www.apple.com/itunes/, copyright 2007 Paramount Pictures, printed Feb. 7, 2007, 2 pages.

Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.

"last.fm the social music revolution," 1 page.

"MyStrands for Windows 0.7.3 Beta," copyright 2002-2006 ShareApple.com networks, printed Jul. 16, 2007, 3 pages.

"LimeWire—Wikipedia, the free encyclopedia," http://en.wikipedia.org/wiki/LimeWire, printed Aug. 8, 2006, 2 pages.

"liveplasma music, movies, search engine and discovery engine," http://www.liveplasma.com, printed May 17, 2007, 1 page.

"Loomia—Personalized Recommendations for Media, Content and Retail Sites," http://www.loomia.com/, copyright 2006-2007 Loomia Inc., printed Feb. 7, 2007, 2 pages.

Jeff Mascia et al., "Lifetrak: Music In Tune With Your Life," copyright 2006, 11 pages.

"Mercora—Music Search and Internet Radio Network," http://www.mercora.com/overview.asp, copyright 2004-2006 Mercora, Inc., printed Aug. 8, 2006, 1 page.

"Mercora—Music Search and Internet Radio Network," http://www.mercora.com/v6/_front/web.jsp, printed Feb. 7, 2007, 1 page.

"Outlook Home Page—Microsoft Office Online," http://office.microsoft.com/en-us/outlook/default.aspx, copyright 2007 Microsoft Corporation, printed Nov. 8, 2007, 1 page.

Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.

MixxMaker: The Mix Tape Goes Online—AppScout, http://www.appscout.com/2008/01/mixxmaker_the_mixtape_goes_onl_1.php, copyright 1996-2009 Ziff Davis Publishing Holdings Inc., printed Aug. 3, 2009, 3 pages.

"Welcome to the Musicmatch Guide," http://www.mmguide.musicmatch.com/, copyright 2001-2004 Musicmatch, Inc., printed Feb. 7, 2007, 1 page.

Tour's Profile, http://mog.com/Tour, copyright 2006-2009 Mog Inc., printed Aug. 3, 2009, 11 pages.

"Mongomusic.com—The Best Download mp3 Resources and Information. This website is for sale!," http://www.mongomusic.com/, printed May 17, 2007, 2 pages.

"Thunderbird—Reclaim your inbox," http://www.mozilla.com/en-US/thunderbird/, copyright 2005-2007 Mozilla, printed Nov. 8, 2007, 2 pages.

"Take a look at the Future of Mobile Music :: MUSIC GURU," http://www.symbian-freak.com/news/006/02/music_guru.htm, copyright 2005 Symbian freak, printed Feb. 7, 2007, 3 pages.

"Music Recommendations 1.0—MacUpdate," http://www.macupdate.com/info.php/id/19575, printed Feb. 16, 2007, 1 page.

"MusicGremlin," http://www.musicgremlin.com/StaticContent.aspx?id=3, copyright 2005, 2006, 2007 MusicGremlin, Inc., printed Oct. 26, 2007, 1 page.

"MusicIP—The Music Search Engine," http://www.musicip.com/, copyright 2006-2007 MusicIP Corporation, printed Feb. 7, 2007, 1 page.

"Digital Music News," http://www.digitalmusicnews.com/results?title=musicstrands, copyright Jun. 2003 Digital Music News, printed Aug. 8, 2006, 5 pages.

"Musicstrands.com Because Music is Social," copyright 2006 MusicStrands, Inc., 2 pages.

"Trillian (software)—Wlikipedia, the free encyclopedia," http://en.wikipedia.org/wiki/Trillian_(instant_messenger), printed Nov. 8, 2007, 11 pages.

"MyStrands for Windows Change Log," http://www.mystrands.com/mystrands/windows/changelog.vm, printed Jul. 16, 2007, 6 pages.

"MyStrands Download," http://www.mystrands.com/overview.vm, printed Feb. 7, 2007, 3 pages.

"Napster—All the Music You Want," http://www.napster.com/using_napster/all_the_music_you_want.html, copyright 2003-2006 Napster, LLC, printed Feb. 7, 2007, 2 pages.

"Try Napster free for 7 Days—Play and download music without paying per song.," http://www.napster.com/choose/index.html, copyright 2003-2007 Napster, LLC, printed Feb. 7, 2007, 1 page.

"FAQ," http://blog.pandora.com/faq/, copyright 2005-2006 Pandora Media, Inc., printed Aug. 8, 2006, 20 pages.

"Pandora Internet Radio—Find New Music, Listen to Free Web Radio," http://www.pandora.com/, copyright 2005-2007 Pandora Media, Inc., printed Feb. 7, 2007, 1 page.

"Pandora Radio—Listen to Free Internet Radio, Find New Music," http://www.pandora.com/mgp, copyright 2005-2007 Pandora Media, Inc., printed Oct. 26, 2007, 1 page.

"RYM FAQ—Rate Your Music," http://rateyourmusic.com/faq/, copyright 2000-2007 rateyourmusic.com, printed Nov. 8, 2007, 14 pages.

"Rhapsody—Full-length music, videos and more—Free," http://www.rhapsody.com/welcome.html, copyright 2001-2007 Listen.com, printed Feb. 7, 2007, 1 page.

Ringo: Social Information Filtering for Music Recommendation, http://jolomo.net/ringo.html, printed Aug. 3, 2009, 1 page.

Badrul M. Sarwar et al., "Recommender Systems for Large-scale E-Commerce: Scalable Neighborhood Formation Using Clustering," 2002, 6 pages.

"Soundflavor," http://www.soundflavor.com/, copyright 2003-2007 Soundflavor, Inc., printed Feb. 7, 2007, 1 page.

"That canadian girl >> Blog Archive >> GenieLab," http://www.thatcanadiangirl.co.uk/blog/2005/02/22/genielab/, copyright 2007 Vero Pepperrell, printed Feb. 16, 2007, 3 pages.

"Trillian (software)—Wikipedia, the free encyclopedia," http://en.wikipedia.org/wiki/Trillian_(instant_messenger), printed Nov. 8, 2007, 11 pages.

"uPlayMe.com Meet People, Music Sharing—About Us," http://www.uplayme.com/about.php, copyright 2008 uPlayMe, Inc., printed Mar. 26, 2009, 4 pages.

"uPlayMe.com Meet People, Music Sharing—Home," http://www.uplayme.com/, copyright 2008 uPlayMe, Inc., printed Mar. 26, 2009, 1 page.

"UpTo11.net—Music Recommendations and Search," http://www.upto11.net/, copyright 2005-2006 Upto11.net, printed Feb. 7, 2007, 1 page.

Wang, Jun et al., "Music Recommender System for Wi-Fi Walkman," Delft University of Technology, date unknown, 23 pages.

"Webjay—Playlist Community," http://www.webjay.org/, copyright 2006 Yahoo! Inc., printed Feb. 7, 2007, 5 pages.

"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.

"Wired News:," http://www.wired.com/news/digiwoo/1,57634-0.html, copyright 2005 Lycos, Inc., printed Oct. 9, 2006, 3 pages.

"Not safe for work—Wikipedia, the free encyclopedia," http://en.wikipedia.org/wiki/Work_safe, printed Nov. 8, 2007, 2 pages.

"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

Yahoo! Music downloaded archival page from www.archive.org for Jun. 20, 2005, copyright 2005 Yahoo! Inc., 14 pages.

"Yahoo Music Jukebox—Wikipedia, the free encyclopedia," http://en.wikipedia.org/wiki/Yahoo_music_engine, printed Aug. 8, 2006, 1 page.

"LAUNCHcast Radio—Yahoo! Messenger," http://messenger.yahoo.com/launch.php, copyright 2007 Yahoo! Inc., printed Nov. 8, 2007, 1 page.

"Music Downloads—Over 2 Million Songs—Try It Free—Yahoo! Music," http://music.yahoo.com/ymu/default.asp, copyright 2006 Yahoo! Inc., printed Feb. 7, 2007, 1 page.

"YouTube—Broadcast Yourself.," http://www.youtube.com/, copyright 2007 YouTube, LLC, printed Oct. 26, 2007, 2 pages.

"Zune.net—How-To—Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.

"Hulu—About," www.hulu.com/about/product_tour, copyright 2010 Hulu LLC, printed Jun. 15, 2010, 2 pages.

"SongReference," http://songreference.com/, copyright 2008, SongReference.com, printed Jun. 15, 2010, 1 page.

Nilson, Martin, "id3v2.4.0-frames—ID3.org," http://www.id3.org/id3v2.4.0-frames, Nov. 1, 2000, copyright 1998-2009, printed Jun. 15, 2010, 31 pages.

"Songbird," http://getsongbird.com/, copyright 2010 Songbird, printed Jun. 15, 2010, 2 pages.

"Anthem—Overview," at <http://www.intercastingcorp.com/platform/anthem>, copyright 2004-2007, Intercasting Corp., printed Jan. 16, 2008, 2 pages.

"MyStrands Labs: Patent-pending Technologies," at <http://labs.mystrands.com/patents.html>, printed Feb. 7, 2007, 5 pages.

Pampalk, E. and Goto, M., "MusicSun: A New Approach to Artist Recommendation," In Proceedings of the 8th International Conference on Music Information Retrieval (ISMIR 2007), Vienna, Austria, Sep. 23-27, 2007, copyright 2007, Austrian Computer Society (OCG), found at <http://citeseerx.ist.psu.edu/viewdoc/download?doi=10.1.1.69.1403&rep=rep1&type=pdf>, 4 pages.

Wang, J. et al., "Wi-Fi Walkman: A wireless handhold that shares and recommend music on peer-to-peer networks," in Proceedings of Embedded Processors for Multimedia and Communications II, part of the IS&T/SPIE Symposium on Electronic Imaging 2005, Jan. 16-20, 2005, San Jose, California, Proceedings published Mar. 8, 2005, found at <http://citeseerx.ist.psu.edu/viewdoc/download?doi=10.1.1.108.3459&rep=rep1&type=pdf>, 10 pages.

* cited by examiner

| User | Title | Artist | Album | Genre | Decade | Location | Score | Playback |
|---|---|---|---|---|---|---|---|---|
| Hugh | Sweet Emotion | Aerosmith | Toys in the Attic | Rock | 1970's | Remote | 95 | 1 |
| Hugh | Walk This Way | Aerosmith | Toys in the Attic | Rock | 1970's | Remote | 95 | 2 |
| Hugh | Round and Round | Aerosmith | Toys in the Attic | Rock | 1970's | Remote | 95 | 4 |
| Hugh | No More No More | Aerosmith | Toys in the Attic | Rock | 1970's | Remote | 95 | 32 |
| Waymen | So What | Miles Davis | Kind of Blue | Jazz | 1960's | Remote | 94 | 3 |
| Gary | Dance in My Sleep | Dave Adams | Dancing in My Sleep | Alternative | 1980's | Remote | 92 | 5 |
| Waymen | Come Away With Me | Norah Jones | Come Away With Me | Jazz | 2000's | Remote | 88 | 6 |
| Mike | Walk the Line | Johnny Cash | Walk the Line | Country | 1970's | Remote | 86 | 7 |
| Gene | Consider Me Gone | Sting | Dream of the Blue Turtles | Rock | 1980's | Remote | 85 | 8 |
| Gene | Fortress Around Your Heart | Sting | Dream of the Blue Turtles | Rock | 1980's | Remote | 85 | 9 |
| Gene | In the Moonlight | Sting | Sabrina | Rock | 1990's | Remote | 82 | 10 |
| Gene | Windmills of My Mind | Sting | The Thomas Crown Affair | Rock | 1990's | Remote | 82 | 34 |
| Gene | All for Love | Sting | Three Musketeers | Rock | 1990's | Remote | 82 | 35 |
| Hugh | Say Hey | The Tubes | Love Bomb | Alternative | 1980's | Local | 86 | 11 |
| Hugh | Dreamers Disease | New Radicals | Maybe You've Been Brainwashed Too | Alternative | 1980's | Remote | 83 | 12 |
| Hugh | Tenderness | General Public | All the Rage | New Wave | 1980's | Local | 83 | 13 |
| Hugh | Running With the Devil | Van Halen | Van Halen | Rock | 1970's | Local | 82 | 14 |
| Gene | Rebel Yell | Billy Idol | Rebel Yell | Punk | 1980's | Remote | 81 | 15 |
| Gene | Beautiful Day | U2 | All That You Can't Leave Behind | Rock | 1980's | Local | 79 | 16 |
| ... assume another 16 songs played in 80 minutes with scores ranging between 78 and 61... | | | | | | | | |
| Mike | Still Lovin' You | Scorpions | Bad for Good | Metal | 1980's | Remote | 60 | 36 |
| Gene | True | Spandau Ballet | True | Dance | 1980's | Remote | 60 | 37 |
| Gary | Heart of the Night | Poco | Alive in the Heart of the Night | Rock | 1970's | Remote | 58 | 38 |
| Gary | Round About | Yes | Fragile | Rock | 1970's | Remote | 57 | 39 |
| Gene | Allison | Elivs Costello | My Aim is True | Alternative | 1980's | Remote | 53 | 40 |
| Gary | Run to the Hills | Iron Maden | The Number of the Beast | Metal | 1970's | Local | 49 | 41 |
| Mike | Veronica | Elivs Costello | Veronica | Rock | 1980's | Remote | 37 | 42 |
| Waymen | Something More | Sugarland | Twice the Speed of Life | Country | 2000's | Remote | 25 | 43 |

*FIG. 6*

METHOD AND SYSTEM FOR POPULATING A CONTENT REPOSITORY FOR AN INTERNET RADIO SERVICE BASED ON A RECOMMENDATION NETWORK

BACKGROUND OF THE INVENTION

Internet radio is a broadcasting service transmitted via the Internet. Many internet radio stations are completely independent from traditional ("terrestrial") radio stations, and broadcast only on the Internet, which is usually referred to as streaming.

Examples of conventional Internet radio services include Pandora and YAHOO Launchcast Radio. Pandora is an Internet radio service that takes a seed song entered by a user and creates a customized radio station. The user can influence, but not control, the station by rating the songs that are suggested. The service operates under the compulsory license for Internet radio.

Yahoo! LAUNCHcast Radio is a streaming music service that allows users to create their own customized radio station tailored to their tastes. Users can rate artists and albums highly to hear them often and ban the ones they dislike. Users can also listen to a collection of more than 130 pre-programmed radio stations created by YAHOO! editorial staff. YAHOO! also offers a Music LAUNCHcast plugin for Yahoo! Instant Messenger (text messaging service). This plugin lets a user's buddies see what the user is currently listening to via LAUNCHcast Radio. The plugin also allows the user's friends to tune into the radio station so that they can listen to the music as well.

Thus, conventional Internet radio services may provide approaches for creating customized radio stations for a particular user that is based on input from that user (e.g., Pandora), or that influenced by a friend of the user (e.g., Yahoo!), but conventional Internet radio services fail to consider peer group influences. For example, the music that a particular teenager listens to may be highly influenced by the music listened to by a group of the teenager's peers, such as his or her friends.

In addition, the costs of starting and operating an Internet radio service can be significant. One significant cost is the cost to build and maintain the content repository of songs the Internet radio service intends to play. Typically, the content repository is populated by buying or otherwise licensing the rights to all the songs the station intends to offer, which could number in the millions. One problem with this is that many of the songs in the content repository may never be played, with much of the costs directed to incorporating new songs and/or one-of-a-kind songs that may turn out to have very limited audiences.

Another component of the costs to maintain the Internet radio service includes the royalties payable to performers of recorded works broadcast on the internet, which continue to increase. The rates currently include a minimum fee of $500 (U.S.) per year, per channel, with escalating fees for each song played. Since the inception of rates in 1998, webcasters have been charged on a per performance basis. For 2006 the applicable fee would be $0.0008 per performance. A performance is defined as streaming one song to one listener. A webcaster with 10,000 listeners would therefore pay 10,000 times the going rate for every streamed song. The fee increases in increments each year, which amounts to $0.0019 per song by 2010. If enforced, this decision could undermine the business models of many Internet radio stations, which had previously relied on the rate of $0.000768 per song that had been unchanged from 1998-2005.

Accordingly, a need exists for an improved method and system for populating the content repository of a media service, such as an Internet radio service, and for playback of the content.

BRIEF SUMMARY OF THE INVENTION

The exemplary embodiment provides a computer-implemented method and system for populating the content repository of a media service based on real-time media recommendation network comprising a plurality of peer devices. Aspects of the exemplary embodiment include receiving by a server a recommendation from one of the plurality of peer devices for a media item that is intended for a recipient; determining if the media item is present in the content repository; in response to determining that the media item is not present in the content repository, requesting that the peer device upload the media item; and in response to the media item being uploaded, storing the media item in the content repository.

According to the method and systems disclosed herein, the Internet radio service obtains media items and populates the content repository from the users of peer devices, thereby only requiring the media service to pay for costs associated with purchasing rights to the media items the members of the media service wish to hear. In addition, when a media item is requested to be played, the Internet radio service determines if the media item is stored on the peer device and if so, has the media item played locally on the peer device, eliminating the need to stream the media item and to pay the associated royalties for the media item that the recipient has already legally obtained.

BRIEF DESCRIPTION OF SEVERAL VIEWS OF THE DRAWINGS

FIG. 6 is a block diagram showing an example recommendation queue having an order of playback based on recommendations, user preferences and a license enforcement algorithm.

DETAILED DESCRIPTION OF THE INVENTION

The present invention relates to methods and systems for populating the content repository of a media service based on a real-time media recommendation network. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain blocks. However, the method and system operate effectively for other methods having different and/or additional blocks not inconsistent with the present invention.

Figure 1:
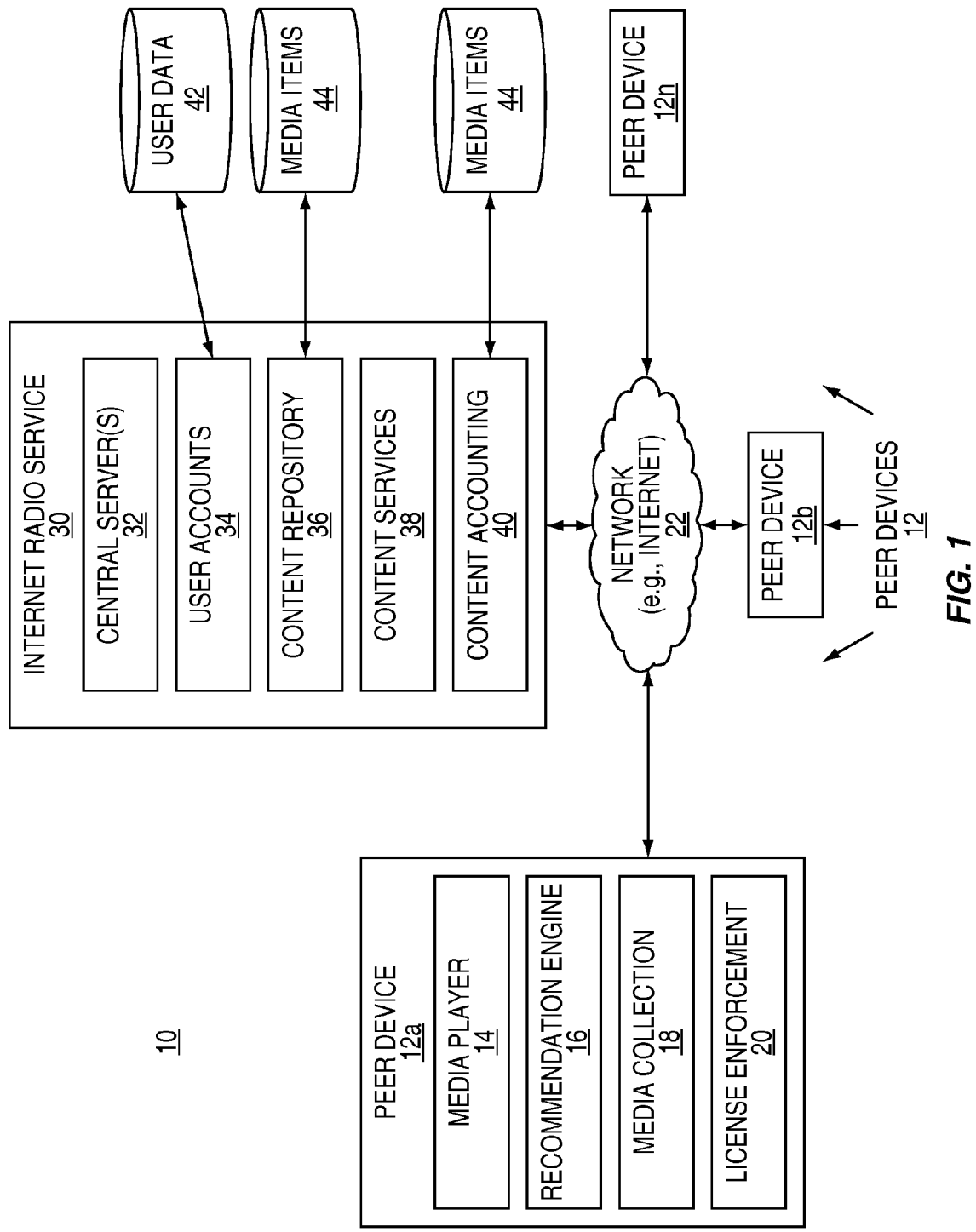
FIG. 1 illustrates a system for populating a content repository of a media service based on a real-time media recommendation network according to one embodiment.

FIG. 1 illustrates a system 10 for populating a content repository of a media service based on a real-time media recommendation network according to one embodiment. In general, the system 10 includes a number of peer devices 12a, 12b, and 12n (collectively referred to as peer devices 12) that are capable of presenting or playing media items 44 and communicating with a media service, such as, but not limited to, Internet radio service 30, via a network 22, such as, but not limited to, the Internet. Note that while the exemplary embodiments may discuss media items 44 in terms of being songs, e.g., mp3s, for clarity and ease of discussion, the term media items 44 is equally applicable to other types of media, such as digital images, slideshows, and video presentations, for example. Exemplary video presentations are movies, television programs, music videos, and the like.

In this embodiment, the peer devices 12 form a peer-to-peer (P2P) network via the network 22. In one embodiment, the peer devices 12 may form a P2P network through direct communication with one another, while in another embodiment, the peer devices 12 may form a P2P network via the Internet radio service 30. The peer devices 12 may be any device having a connection to the network 22 and audio playback capabilities. For example, the peer devices 12 may be personal computers, laptop computers, mobile telephones, portable audio players, PDAs, or the like having either a wired or wireless connection to the network 22.

Each of the peer devices 12 may include a media player 14, a recommendation engine 16, a media collection 18 and a license enforcement algorithm 20. In general, the media player 14 operates to play media items, e.g., songs, from the media collection 18. The media collection 18 includes any number of media items stored in one or more digital storage units such as, for example, one or more hard-drives, FLASH memories, memory cards, internal Random-Access Memory (RAM), external digital storage devices, or the like. The recommendation engine 16 provides recommendations identifying media items to the other peer devices 12. The media player 14 and the recommendation engine 16 may be implemented in software, hardware, or a combination of hardware and software. The recommendation engine 16 may alternatively be incorporated into the media player 14.

In operation, each time a song is played by the media player 14, the recommendation engine 16 operates to provide a recommendation identifying the media item to the other peer devices 12b, 12n via the P2P network. The recommendation does not include the media item. In one embodiment, the recommendation may be a recommendation file including information identifying the media item. In addition, as discussed below in detail, the recommendation engine 16 operates to programmatically, or automatically, select a next media item to be played by the media player 14 based on the recommendations received from the other peer devices 12b, 12n identifying media items recently played by the other peer devices 12b, 12n and user preferences associated with the user of the peer device 12a.

In accordance with a further embodiment of the exemplary embodiment, the license enforcement algorithm 20 allows the media player 14 to play the highest recommended media items, while maintaining compliance with compulsory licenses for Internet radio, as explained further below.

The Internet radio service 30 may include one or more central servers 32 (collectively referred to as central server 32) connected to the network 22. The central server 32 may host a user accounts module 34, a content repository 36, a content services module 38, and a content accounting module 40. The user accounts module 34 may maintain information regarding members of the Internet radio service 30 in the form of user data 42. The members of the Internet radio service 30 preferably correspond to the users of the peer devices 12.

According to the exemplary embodiment, the content repository 36 is populated one media item 44 at a time (e.g., one song or track) as each user recommends media items 44 that are new to the Internet radio service 30. The content repository 36 may maintain information identifying each newly added media item 44. Rather than populating the content repository 36 with a large amount of media items for which rights have been purchased but that may never be requested or played, which can be expensive for a large library of media items 44, the exemplary embodiment populates the content repository 36 only with media items 44 uploaded from users of the peer devices 12 as the users make recommendations to one another through the Internet radio service 30. Since the Internet radio service 30 need only obtain rights for the recommended media items 44 that have been uploaded, the Internet radio service 30 may realize a significant cost savings in populating the content repository 36.

The content services module 38 is responsible for identifying new media items 44, and in the case of songs, streaming songs to end points, and generating previews from full length songs. The content accounting module 40 may be used to control licensing elements (e.g., royalty payments for broadcast music), including information about licensed media items 46 and labels with which the Internet radio service 30 has licensing arrangements and the licensing rules containing the parameters for controlling adherence to various licensing schemes. The licensed media items 46 represent a list of media items for which rights have been obtained and are therefore a subset of the uploaded media items 44. Also, the licensed media items 46 may be implemented as a table of GUIDs, rather than actual files.

Figure 2:
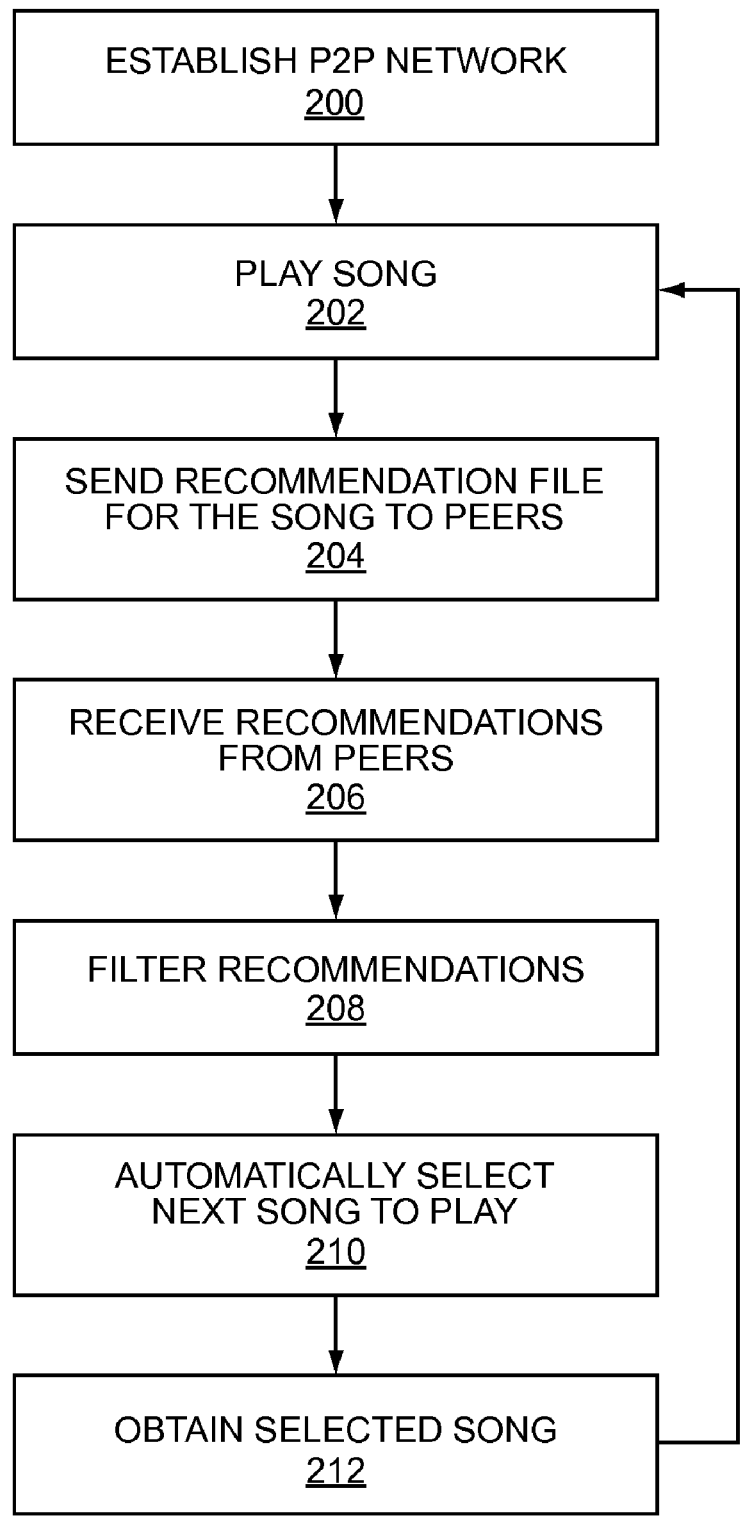
FIG. 2 is a flow diagram illustrating the operation of the peer devices of FIG. 1 according to one embodiment.

FIG. 2 is a flow diagram illustrating operation of the peer devices of FIG. 1 according to one embodiment. In this example, the media item 44 is described as being a song. First, the peer devices 12 cooperate to establish a P2P network (block 200). The P2P network may be initiated using, for example, an electronic or verbal invitation. Invitations may be desirable when the user wishes to establish the P2P network with a particular group of other users, such as his or her friends. Note that this may be beneficial when the user desires that the music he or she listens to be influenced only by the songs listened to by, for example, the user's friends. Invitations may also be desirable when the number of peer devices 12 within a local wireless coverage area of the peer device 12 is large. As another example, the peer device 12 may maintain a "buddy list" identifying friends of the user of the peer device 12, where the peer device 12 may automatically establish a P2P network with the peer devices 12 of the users identified by the "buddy list" when the peer devices are within a local wireless coverage area of the peer device 12.

Alternatively, the peer device 12a may establish an ad-hoc P2P network with the other peer devices 12b, 12n by detecting the other peer devices 12b, 12n within the local wireless coverage area of the peer device 12a and automatically establishing the P2P network with at least a subset of the detected peer devices 12b, 12n. In order to control the number of peer devices within the ad-hoc P2P network, the peer device 12a may compare user profiles of the users of the other peer devices 12b, 12n with a user profile of the user of the peer device 12a and determine whether to permit the other peer devices 12b, 12n to enter the P2P network based on the similarities of the user profiles.

At some point after the P2P network is established, the peer device 12 plays a song (block 202). Initially, before any recommendations have been received from the other peer devices 12b, 12n, the song may be a song from the media collection 18 selected by the user of the peer device 12a. Prior to, during, or after playback of the song, the recommendation engine 16 sends a recommendation identifying the song to the other peer devices 12b, 12n (block 204). In one embodiment, the recommendation is sent directly from the peer device 12a to one or more of the other peer devices 12b, 12n. In another embodiment, the recommendation is first sent from the peer device 12a to the central server 32, which then forwards the recommendation to the intended recipients of the other peer devices 12b, 12n. In one embodiment, the user of the peer device 12a may select which other members of the P2P network to send the recommendation to by selecting names or IDs from a friend or buddy list.

The recommendation may include, but is not limited to, an identifier of the recipient(s) and information identifying the song. Information identifying the song may include a Globally Unique Identifier (GUID) for the song, a title of the song, or the like; a Uniform Resource Locator (URL) enabling other peer devices to obtain the song such as a URL enabling download or streaming of the song from the Internet radio service 30 or a URL enabling purchase and download of the song from an e-commerce service; a URL enabling download or streaming of a preview of the song from the Internet radio service 30 or a similar e-commerce service; metadata describing the song such as ID3 tags including, for example, genre, the title of the song, the artist of the song, the album on which the song can be found, the date of release of the song or album, the lyrics, and the like.

The recommendation may also include a list of recommenders including information identifying each user having previously recommended the song and a timestamp for each recommendation. For example, if the song was originally played at the peer device 12b and then played at the peer device 12n in response to a recommendation from the peer device 12b, the list of recommenders may include information identifying the user of the peer device 12b or the peer device 12b and a timestamp identifying a time at which the song was played or recommended by the peer device 12b, and information identifying the user of the peer device 12n or the peer device 12n and a timestamp identifying a time at which the song was played or recommended by the peer device 12n. Likewise, if the peer device 12a then selects the song for playback, information identifying the user of the peer device 12a or the peer device 12a and a corresponding timestamp may be appended to the list of recommenders.

The peer device 12a, and more specifically the recommendation engine 16, also receives recommendations from the other peer devices 12b, 12n (block 206). The recommendations from the other peer devices 12b, 12n identify songs played by the other peer devices 12b, 12n. Optionally, the recommendation engine 16 may filter the recommendations from the other peer devices 12b, 12n based on, for example, user, genre, artist, title, album, lyrics, date of release, or the like (block 208).

The recommendation engine 16 then automatically selects a next song to play from the songs identified by the recommendations received from the other peer devices 12b, 12n, optionally songs identified by previously received recommendations, and one or more songs from the media collection 18 based on user preferences (block 210). In another embodiment, the recommendation engine 16 may consider all previously received recommendations, where the recommendations may expire after a predetermined or user defined period of time, or may consider only those songs identified by recommendations received since a previous song selection. This may be beneficial when the peer device 12 has limited processing and memory capabilities.

As discussed below, the user preferences used to select the next song to play may include a weight or priority assigned to each of a number of categories such as user, genre, decade of release, and location/availability. Generally, location identifies whether songs are stored locally in the media collection 18; available via the Internet radio service 30; available for download, and optionally purchase, from an e-commerce service or one of the other peer devices 12b, 12n; or are not currently available where the user may search for the songs if desired. The user preferences may be stored locally at the peer device 12 or obtained from a central server via the network 22. If the peer device 12 is a portable device, the user preferences may be configured on an associated user system, such as a personal computer, and transferred to the peer device 12 during a synchronization process. The user preferences may alternatively be automatically provided or suggested by the recommendation engine 16 based on a play history of the peer device 12. In the exemplary embodiment, the songs identified by the recommendations from the other peer devices 12b, 12n and the songs from the media collection 18 may be scored or ranked based on the user preferences. Then, based on the scores, the recommendation engine 16 selects the next song to play.

A process for scoring the recommended songs based on the user preferences is described in co-pending application Ser. No. 11/484,130 entitled "P2P Network for Providing Real Time Media Recommendations", filed on Jul. 11, 2006, which is incorporated herein by reference in its entirety.

Once the next song to play is selected, the peer device 12 obtains the selected song (block 212). If the selected song is part of the media collection 18, the peer device 12a obtains the selected song from the media collection 18. If the selected song is not part of the media collection 18, the selected song may be obtained from the Internet radio service 30 via streaming, or obtained from an e-commerce service or from one of the other peer devices 12b, 12n. For example, the recommendation for the song may include a URL providing a link to a source from which the song may be obtained, and the peer device 12 may obtain the selected song from the source identified in the recommendation for the song. Once obtained, the selected song is played and the process repeats (blocks 202-212).

Figure 3:
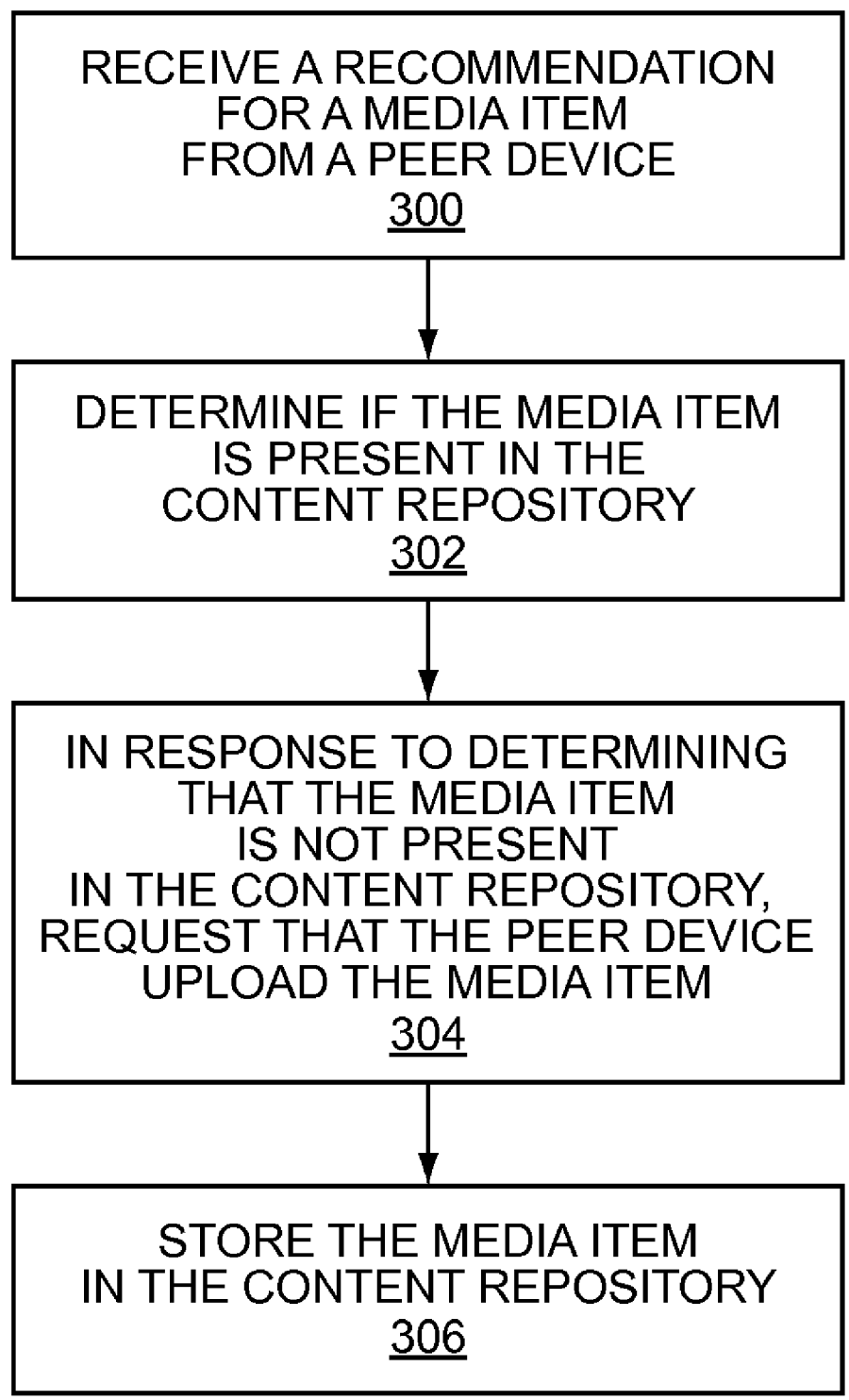
FIG. 3 is flow diagram illustrating a process for populating the content repository of the Internet radio service based on the real-time media recommendation network according to one embodiment of the present invention.

FIG. 3 is flow diagram illustrating a process for populating the content repository of the Internet radio service based on a real-time media recommendation network according to one embodiment of the present invention. The process begins by the central server 32 receiving a recommendation from a peer device 12 for a media item 44 that is intended for a recipient (block 300). The central server 32 determines if the media item 44 is present in the content repository 36 (block 302).

In response to determining that the media item 44 is not present in the content repository 36, the central server 32 requests that the peer device 12 upload the media item 44 (block 304). In response to the media item 44 being uploaded, the media item 44 is stored in the content repository 36 (block 306). According to the method and systems disclosed herein, the Internet radio service 30 obtains media items 44 and populates the content repository 36 from the users of peer devices 12 thereby significantly reducing the upfront costs associated with purchasing rights to the media items 44.

In a further aspect of the exemplary embodiment, the Internet radio service 30 may then play the media item 44 locally on the recipient's peer device if the media item 44 is stored locally on the recipient's peer device 12b, which should further reduce any royalty payments owed by the Internet radio service 30.

As described above, the process for sending the recommendations between the peer devices 12 and the central server 32 may be implemented in different embodiments. In one embodiment of the P2P network, the peer device 12a may send recommendations to the central server 32 for forwarding to the other peer devices 12b, 12n, and the central server 32 may perform block 302 in response to receiving recommendations from the peer device 12a. In another embodiment of the P2P network, however, the peer devices 12 can send recommendations directly to one another, bypassing the central server 32. In this case, after a receiving peer device 12b receives one of the recommendations from a sending peer device 12a, and either before or after the receiving peer device 12b plays the media item 44, the receiving peer device 12b can forward the received recommendation to the central server 32. The central server 32 may then perform block 302 in response to receiving the forwarded recommendation.

Figure 4:
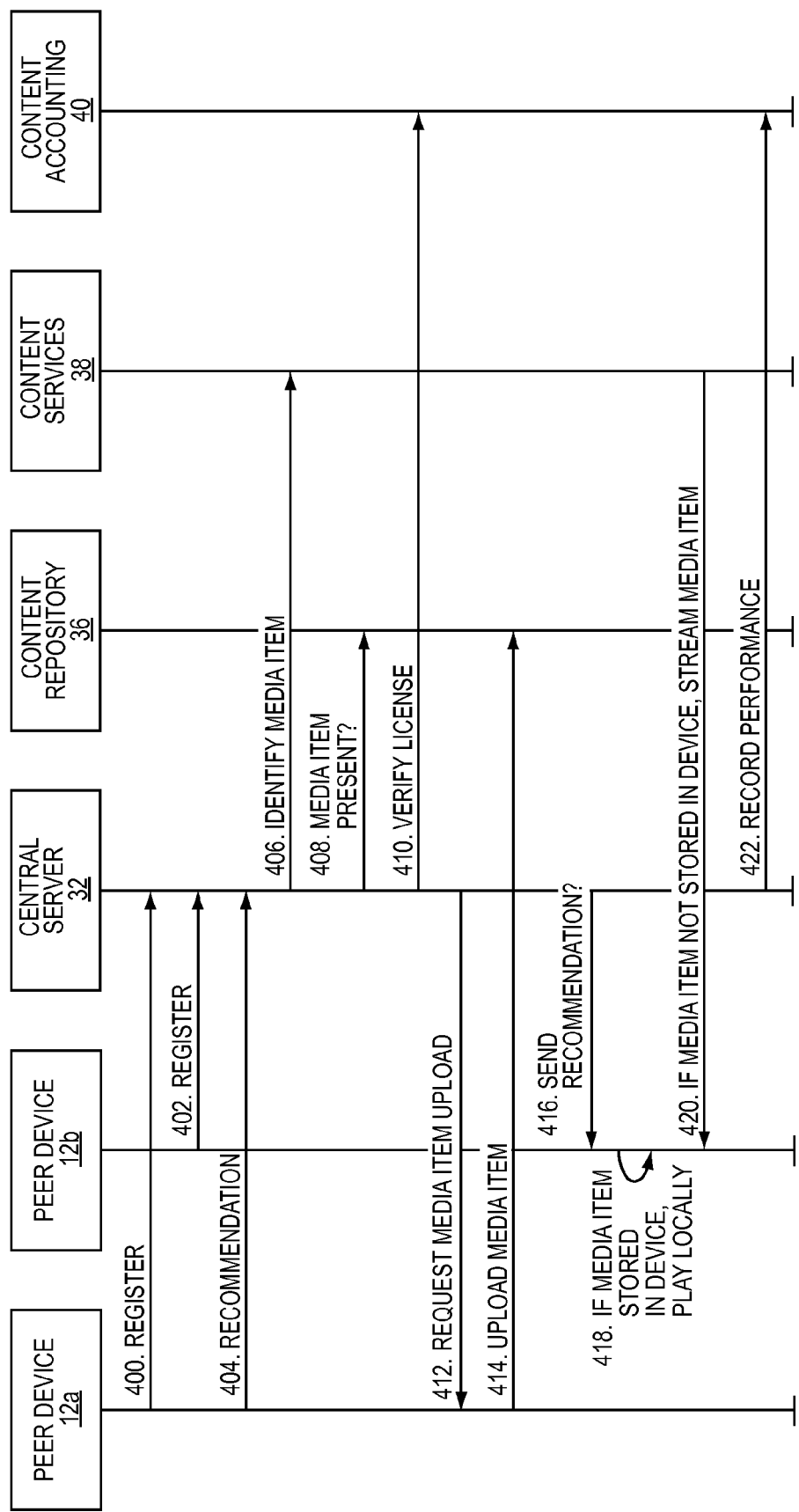
FIG. 4 is a flow diagram illustrating operation of the system for populating the content repository with media items based on recommendations received in the P2P network in further detail.

FIG. 4 is a flow diagram illustrating operation of the system 10 for populating the content repository with media items based on recommendations received in the P2P network in further detail. In this embodiment, the process begins with the peer devices 12a and 12b registering with a central server 32 (blocks 400 and 402). Registration may include the users of the peer devices 12a and 12b establishing accounts and becoming members of the Internet radio service 30 and uploading information identifying their respective peer devices 12a and 12b.

The user of peer device 12a may then send a recommendation for a media item 44 to a user of peer device 12b, i.e., the recipient, via the central server 32 (block 404). If the sending peer device 12a is able to determine the GUID of the media item 44 to identify the media item 44, the peer device 12a would send the GUID of the media item 44 in the recommendation, and the central server 32 could use the GUID to query the content repository 36 to search for the media item 44.

If the peer device 12 is unable to determine the GUID of the media item 44, then the peer device 12a could generate an acoustic fingerprint for the media item 44, and send the acoustic fingerprint in the recommendation. In this case, in response to receiving the recommendation, the central server 32 may request the content services module 38 to identify the media item 44 referred to in the recommendation by sending the acoustic fingerprint to a metadata service to retrieve metadata identifying the media item 44 (block 406). Examples of the metadata identifying the media item 44 may include the GUID. An example of a commercially available metadata service is GRACENOTE.

The central server 32 then determines if the media item 44 referred to in the recommendation is present in the content repository 36 (block 408) by querying the content repository 36 with metadata identifying the media item 44.

Using the metadata identifying the media item 44, the central server 32 may request the content accounting module 40 to perform license verification on the media item 44 (block 410). This is accomplished by submitting the metadata identifying the media item 44 (e.g., the GUID) to a licensing clearinghouse, such as SOUNDEXCHANGE, which uses the metadata to query a licensing or copyright database to determine if an entity has rights to play a queried media item 44. The licensing clearinghouse may return a value indicating whether the Internet radio service 30 has the requisite license to stream the media item 44 based on a compulsory license for Internet radio (described below). If the value is negative, then the Internet radio service 30 may discard the recommendation and notify the user of peer device 12a that sent the recommendation that the recommendation was rejected. Alternatively, the Internet radio service 30 may complete the transaction but take note of the license verification failure, and once the rights holders are correctly identified, pay the appropriate license at that time.

If the media item 44 is not present in the content repository 36 and/or if the media item 44 could not be identified in block 406, then the central server 32 may send a request to the peer device 12a to upload the media item 44 (block 412). The media item 44 is then uploaded from the peer device 12a to the content repository 36 (block 414). In one embodiment, the media item 44 may be first received by the central server 32 and then stored in the content repository 36. In another embodiment, the request sent to the peer device 12a may include a URL of the content repository 36 for direct upload and storage.

In one embodiment (not shown), if the media item 44 fails either the identification or the license verification, then the media item 44 may be moved into a separate holding area for manual intervention, and the user of peer device 12a that sent the recommendation can be notified of the recommendation failure. However, such an unfulfilled recommendation can be fulfilled at a later date if and when the identification and/or license verification issue is/are resolved.

In response to the media item 44 being uploaded, the central server 32 may forward the recommendation to the recipient's peer device 12b, including the metadata identifying the media item 44, such as the GUID (block 416). In one embodiment (not shown), the central server 32 may also send a query asking whether the media item 44 is stored locally on the peer device 12b.

If the media item 44 is stored locally on the peer device 12b, then the media item 44 is played locally on the peer device 12b (block 418). Playing the media item 44 locally on the peer device 12b has the advantage of saving the Internet radio service 30 money. Since the Internet radio service 30 is not streaming the media item 44, play of the media item 44 should not factor into any Compulsory License for Internet Radio royalty calculations, and the Internet radio service 30 should not owe any royalty payments to any licensing clearinghouse. Playing the media item 44 locally and not streaming the media item 44 has an additional advantage of saving bandwidth costs and potentially providing an improved user experience depending on the speed and type of Internet connection used.

If the media item 44 is not stored locally on the peer device 12b, then the Internet radio service 30 streams the media item 44 to the recipient's peer device 12b via the content services module 38 (block 420). Note, that if the media item 44 could not be identified in block 406, then block 420 could include streaming a preview (e.g., a short clip) of the media item 44 to the recipient's peer device 12b and letting the recipient confirm whether the entire media item 44 should be streamed.

Finally, the Internet radio service 30 records performance of the streaming for royalty payment purposes (block 422). That is, the compulsory Internet radio broadcast license is followed and royalty payments are made to corresponding copyright holders.

Internet radio stations have to contend with two types of royalties when they broadcast music. They must pay a royalty to the composer of the music ("composer royalty"). They must also pay royalties to the performers of the music ("performer royalty"). An example of the difference would be the Internet streaming of the song "I'm a Believer" by Smash Mouth from the movie Shrek. Neil Diamond is the actual composer of the song, and so he is entitled to a composer royalty for the broadcast. But Smash Mouth is the performer, and so they are entitled to a performer royalty for the broadcast.

The performer royalty came about through two major laws, namely the Digital Performance in Sound Recordings Act of 1995 and the Digital Millennium Copyright Act of 1998. The performer royalty (less administration fees) is split 50% for the record labels, 45% for the featured artists, and 5% for non-featured artists. The performer royalty is a result of the compulsory license for Internet radio, as discussed below.

Composer royalties are paid to the traditional performing rights organizations: American Society of Composers, Authors, and Publishers (ASCAP), Broadcast Music Incorporated (BMI), and Society of European Stage Authors & Composers (SESAC).

The royalty schemes for each organization differ slightly, and they depend on whether or not the site is providing interactive services or non-interactive services (i.e. whether or not the user can control the music they are playing back). But they generally involve taking the largest fee of the following calculations: (1) a specified rate times the revenue generated by the website, either through user subscriptions or ad support, (2) a specified rate times the amount of internet radio streaming as measured by aggregate tuning hours (ATH), or (3) a minimum fee.

For example, an ATH of 2 represents either streaming for 2 hours to 1 user or streaming 1 hour for 2 users. As an example of the rate calculation, for ASCAP, the royalty for non-interactive services is based on the largest of either 0.0185 times the site revenue, 0.0006 times the ATH of the site, or a minimum fee of $288.

Performer royalties are paid to SOUNDEXCHANGE. Rates for this royalty are set by the Copyright Royalty Board. The current rates set for the years 2006-2010 are as follows. For commercial webcasters, there is a minimum annual fee of $500 per channel payable in advance against the royalties shown in Table 1 on a per play per listener rate:

TABLE 1

| | Year | | | | |
|---|---|---|---|---|---|
| | 2006 | 2007 | 2008 | 2009 | 2010 |
| Rate | 0.08 | 0.11 | 0.14 | 0.18 | 0.19 |

For non-commercial webcasters, there is an annual fee of $500 per channel, up to a total of 159,140 aggregate tuning hours ("ATH") per month. After this, the per-play rate for commercial webcasters applies.

In order to make it easier for Internet radio broadcasters to initiate their business without first obtaining explicit broadcasting rights from all artists and copyright holders, a Compulsory License for Internet Radio was established. If a webcaster adheres to strict regulations, then they are covered by the compulsory license and do not need to obtain explicit copyright permissions for their broadcasts.

The requirements for the compulsory license include the following: 1) The webcaster must register with the Copyright Office. 2) The webcaster must comply with performance restrictions. 3) The webcaster cannot provide an interactive service where the listener dictates the content of the stream. 3) The webcaster must identify the song title, album of origin, and featured artist at the time the song is played. 4) The webcaster cannot broadcast more than 3 selections from any one album in any 3 hour period and no more than 2 selections can be played consecutively. 4) The webcaster cannot broadcast more than 4 selections from the same featured artist from any album in any 3 hour period and no more than 3 selections can be played consecutively. 5) The webcaster cannot publish an advance program schedule which identifies when a specific song, album, or artist will be played. And 6) the webcaster must pay all applicable royalties to a clearinghouse, presently, SOUNDEXCHANGE.

In order for the Internet radio service 30 to be compliant with the Compulsory License for Internet Radio, then the user of the peer devices 12 will lose the ability to choose which song to play in their queue of recommended items, as this would be an interactive service. Thus, the users of the peer devices 12 will be restricted to only playing the highest scored media item 44 according to their preferences.

According to a further aspect of the exemplary embodiment, however, the license enforcement algorithm 20 (FIG. 1) will allow the users of the peer devices 12 to change their preferences and thus rearrange the queue, but before the highest scored media item 44 is played, the license enforcement algorithm 20 will check for compliance with compulsory license restrictions for Internet radio (within the peer device 12) in accordance with the process shown in FIG. 5, discussed below.

The restrictions set forth by the Compulsory License for Internet Radio currently apply to any given 3 hour window. As such, it is necessary for the peer device 12 to track specific information about songs from the same album that are streamed to the corresponding peer device 12. By tracking this information, the peer device 12 is able to enforce compliance with the compulsory license, but make sure that the user of the peer device 12 is eligible to stream the media items most desired as soon as it is eligible.

In one embodiment, the license enforcement algorithm 20 may utilize tables to track the song and album information streamed to the peer device 12. For example, the tables may include an Album Recently Played Table and an Artist Recently Played Table. The Album Recently Played Table, for example, may include the following fields:

1. Album Entered Time—the first time when a song from an album is streamed to the corresponding peer device.
2. Last Song Played Time—the time when the most recent song from the album has been streamed.
3. Consecutive Time—the time when the last consecutive song from the same album has been streamed.
4. Track Count—a count of songs from the same album that have been streamed.
5. Consecutive Count—a count of songs from the same album that have been streamed consecutively.

Figure 5:
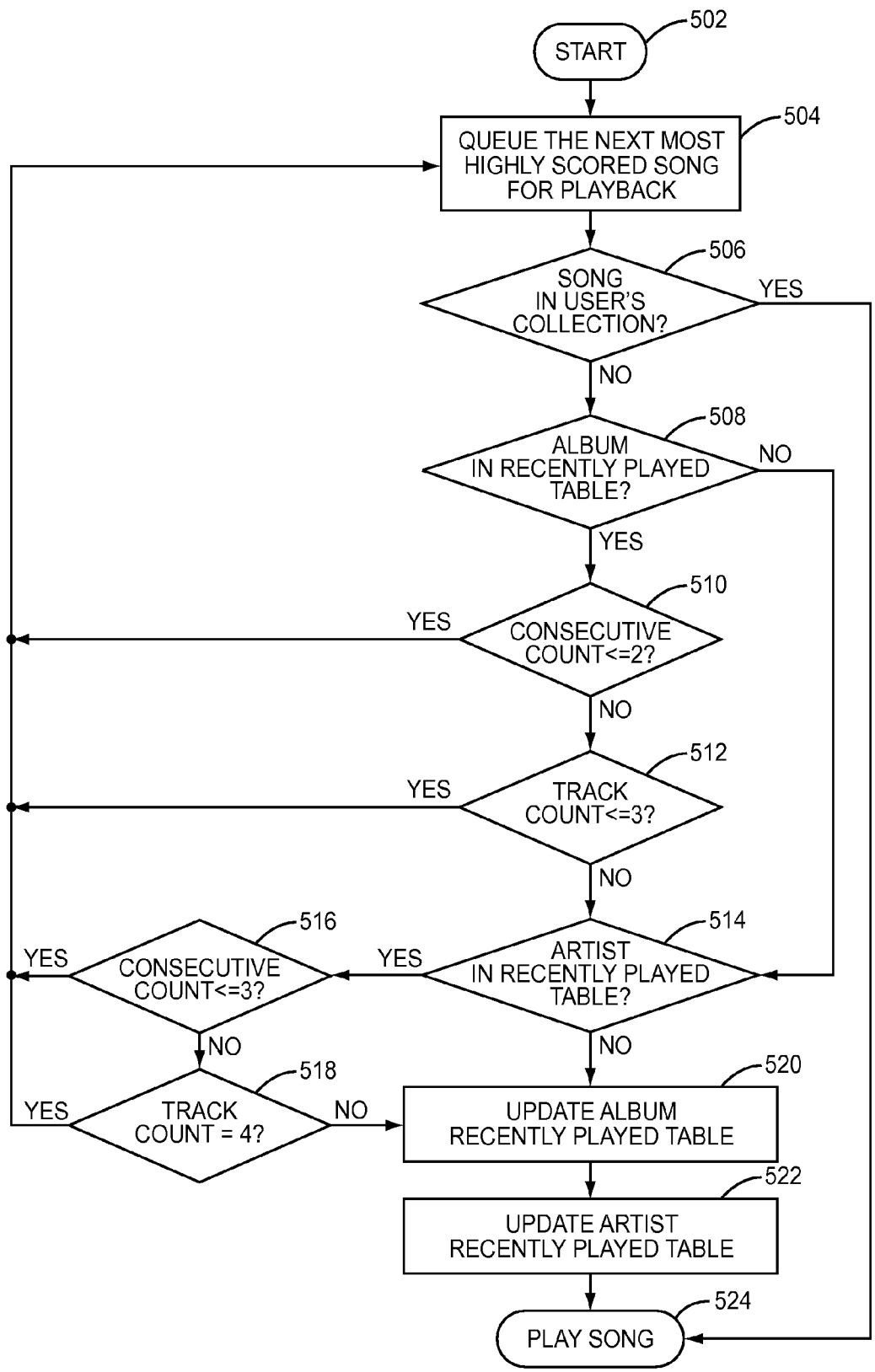
FIG. 5 is a diagram illustrating a process for determining media item playback within a peer device with respect to compulsory license restrictions for Internet radio in accordance with a further aspect of the exemplary embodiment.

FIG. 5 is a diagram illustrating a process for determining media item playback within a peer device 12 with respect to compulsory license restrictions for Internet radio in accordance with a further aspect of the exemplary embodiment. In response to the process being initiated (block 502), the next most highly scored media item 44 is queued for playback (block 504). The license enforcement algorithm 20 determines if the media item 44 is in the media collection 18 (block 506). The license enforcement algorithm 20 then determines if the album that the media item 44 belongs to is in the recently played table (block 508). If yes, then the license enforcement algorithm 20 determines if the consecutive count for the artist less than or equal to two (block 510). If not, then the license enforcement algorithm 20 determines if the track count less than or equal to three (block 512).

If either the consecutive count for the artist is greater than two (blocks 510) or the track count is greater than three (block 512), then the compulsory license restriction is exceeded and the process proceeds to queuing the next most highly scored media item (block 504).

If the track count is less than or equal to three (block 512) or the album is not in the recently played table (block 508), then the license enforcement algorithm 20 determines if the artist is in the recently played table (block 514). If the artist is in the recently played table, then the license enforcement algorithm 20 determines if the consecutive count for the artist is less than or equal to three (block 516). If not, then the license enforcement algorithm 20 determines if the track count less than or equal to four (block 518).

If either the consecutive count for the artist is greater than two (blocks 516) or the track count is greater than four (block 518), then the compulsory license restriction is exceeded and the process proceeds to queuing the next most highly scored media item (block 504).

If the artist is not in the recently played table (block 514) or if the track count is greater than four (block 518), then the license enforcement algorithm 20 updates the Album Recently Played Table (block 520). The license enforcement algorithm 20 also updates the Artist Recently Played Table (block 522). After the Artist Recently Played Table has been updated (block 522) or if the media item 44 is determined to be already in the user's collection (block 506), then the media player 14 plays media item 44 on the peer device 12. Notice that in the case where the media item 44 is in the user's collection 44 and played locally, there is no need to track the album and artist information since nothing is being streamed from the Internet radio service 30.

As an example of the overall system 10, consider a user of the Internet radio service 30 who is just logged in for a new session and has the recommendation queue on his peer device 12 shown in FIG. 6. FIG. 6 is a block diagram showing an example recommendation queue having an order of playback based on recommendations, user preferences and the license enforcement algorithm 20.

The columns shown in white in the recommendation queue reflect what may be visible to the user in the graphical user interface (GUI) of the peer device 12. A shaded playback column is added to show how the order of the playback of the items in the queue would be affected by the compulsory license for Internet radio. As shown in the example, the most highly scored song in the user's queue is the song "Sweet Emotion" by Aerosmith from the "Toys in the Attic" album. Note that this is a "remote" selection for the user, meaning that the user does not contain a local copy of this song and will need to have it streamed from the content repository 36 under the compulsory license.

Since this is a new session for the user, the license enforcement algorithm 20 determines that there are no restrictions yet as to which songs can be played, so, the song is played. The album is added to a Album Recently Played Table on the peer device 12 that is used to ensure compliance with the regulations for the compulsory license for Internet radio, as shown in Table 2.

TABLE 2

| Album Entered Time | Song Played Time | Consecutive Time | Album | Track Count | Consecutive Count |
|---|---|---|---|---|---|
| 1:02:16 p.m. | 1:02:16 p.m. | 0:00:00 | Toys in the Attic | 1 | 1 |

The next most highly scored song in the user's queue is another song by Aerosmith ("Walk this Way") from the same album. Again, no restrictions apply yet from the compulsory license and so the song is played. Note that the Album Recently Played Table is updated as shown in Table 3. Since the second song from the same album has been streamed consecutively, the Consecutive Time is entered and the Consecutive Count is incremented. The Last Song Played Time is updated as well, as the Track Count.

TABLE 3

| Album Entered Time | Song Played Time | Consecutive Time | Album | Track Count | Consecutive Count |
|---|---|---|---|---|---|
| 1:02:16 p.m. | 1:07:23 p.m. | 1:07:23 p.m. | Toys in the Attic | 2 | 2 |

As shown in FIG. 6, the next most highly scored song in the user's queue is another song by Aerosmith ("Round and Round") from the same album. Since the compulsory license disallows more than 2 consecutive tracks from the same album in any given 3 hour window, the user is forced to play the next most highly scored song in their queue. Unfortunately, this too is an Aerosmith song from the same album ("No More No More"). Therefore, the license enforcement algorithm 20 skips the song "No More No More" and plays the next most highly scored song, which is "So What" by Miles Davis. Since this too is a remote track and must be streamed, this will break up the consecutive streaming of Aerosmith songs from the same album. After "So What" is streamed, the Album Recent Played Table is updated as shown in Table 4. Note that the table has been updated to show the addition of the "Kind of Blue" album.

TABLE 4

| Album Entered Time | Song Played Time | Consecutive Time | Album | Track Count | Consecutive Count |
|---|---|---|---|---|---|
| 1:02:16 p.m. | 1:07:23 p.m. | 1:07:23 p.m. | Toys in the Attic | 2 | 1 |
| 1:12:43 p.m. | 1:12:43 p.m. | 0:00:0 | Kind of Blue | 1 | 1 |

Note also that since the user has streamed a track from a different album, the Consecutive Count for the "Toys in the Attic" album has been decremented. But the Consecutive Time for this album still contains a value. Together, these two pieces of information indicate that a pair of songs has been streamed consecutively from this album in the 3 hour window, but that they have not been streamed most recently, and so the user can continue to stream songs from this album until the track count restriction is encountered. Continuing with the example, the next most highly scored song in the user's queue is still the Aerosmith song ("Round and Round"). Since a song from a different album has been streamed, the user is able to stream this song. After playing this song, the Last Song Played Time is updated in the table (see Table 5) as well as the Track Count.

TABLE 5

| Album Entered Time | Song Played Time | Consecutive Time | Album | Track Count | Consecutive Count |
|---|---|---|---|---|---|
| 1:02:16 p.m. | 1:18:23 p.m. | 1:07:23 p.m. | Toys in the Attic | 3 | 1 |
| 1:12:43 p.m. | 1:12:43 p.m. | 0:00:0 | Kind of Blue | 1 | 1 |

The next most highly scored song in the user's queue is the Aerosmith song ("No More No More"). However, since the user has now streamed 3 tracks from the same album in a given 3 hour period, the user will have to wait until the 3 hour window has expired before returning to this song in the queue. As the user approaches the end of the first 3 hours of their listening session, the times in the Album Recently Played Table are shuffled out so that the restrictions on songs from "Toys in the Attic" are gradually eliminated and the album is eventually removed from the Album Recently Played Table.

A method and system for populating a content repository of a media service based on a real-time media recommendation network has been disclosed. The present invention has been described in accordance with the embodiments shown, and one of ordinary skill in the art will readily recognize that there could be variations to the embodiments that would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

We claim:

1. A computer-implemented method of operating a server in a real-time media recommendation network to populate a content repository of a media service, the method comprising:
   receiving by the server a recommendation of a media item from a first peer device of a plurality of peer devices for a second peer device of the plurality of peer devices;
   determining if the media item is present in the content repository;
   in response to determining that the media item is not present in the content repository, requesting that the first peer device upload the media item to the server; and
   in response to the media item being uploaded, storing the media item in the content repository.

2. The computer-implemented method of claim 1 further comprising:
   receiving a request to stream the media item to the second peer device if the second peer device determines that the media item is not stored locally on the second peer device; and
   streaming the media item to the second peer device.

3. The computer-implemented method of claim 2 further comprising recording performance of the streaming for royalty payment purposes.

4. The computer-implemented method of claim 1 further comprising forwarding the recommendation from the server to the second peer device.

5. The computer-implemented method of claim 1 further wherein the received recommendation includes a GUID of the media item and an acoustic fingerprint of the media item.

6. The computer-implemented method of claim 5 further comprising sending the acoustic fingerprint from the server to a metadata service to retrieve metadata identifying the media item.

7. The computer-implemented method of claim 6 further comprising if the media item fails the identification, then moving the media item into a separate holding area for subsequent identification, and notifying the first peer device that sent the recommendation of an identification failure.

8. The computer-implemented method of claim 6 further comprising if the media item fails the identification, then receiving a confirmation from the second peer device indicating that the media item should be streamed and streaming the media item to the second peer device.

9. The computer-implemented method of claim 1 further comprising using metadata identifying the media item to perform license verification on the media item.

10. The computer-implemented method of claim 9 further comprising if the media item fails the license verification, then moving the media item into a separate holding area for subsequent license verification, and notifying the first peer device that sent the recommendation of a license verification failure.

11. A system comprising:
   a media service, the media service in communication with a plurality of peer devices in a real-time media recommendation network, the media service comprising a server and a content repository; wherein the server is adapted to:
      receive a recommendation from a first one of the plurality of peer devices for a media item for a second one of the plurality of peer devices;
      determine if the media item is present in the content repository;
      in response to determining that the media item is not present in the content repository, request that the first peer device upload the media item to the server; and
      in response to the media item being uploaded, store the media item in the content repository, thereby populating the content repository.

12. The system of claim 11 wherein the server is further adapted to:
   receive a request to stream the media item to the second peer device if the second peer device determines that the media item is not stored locally on the second peer device; and
   stream the media item to the second peer device.

13. The system of claim 12 wherein the server is further adapted to record performance of the streaming for royalty payment purposes.

14. The system of claim 11 wherein the server is further adapted to forward the recommendation to the second peer device.

15. The system of claim 11 wherein the received recommendation includes a GUID of the media item and an acoustic fingerprint of the media item.

16. The system of claim 15 wherein the server is further adapted to send the acoustic fingerprint to a metadata service to retrieve metadata identifying the media item.

17. The system of claim 16 wherein the server is further adapted to, if the media item fails the identification, move the media item into a separate holding area for subsequent identification, and notify the first peer device that sent the recommendation of an identification failure.

18. The system of claim 16 wherein the server is further adapted to, if the media item fails the identification, streamed receive a confirmation from the second peer device indicating that the media item should be streamed and stream the media item to the second peer device.

19. The system of claim 11 wherein metadata is used to identify the media item to perform license verification on the media item.

20. The system of claim 19 wherein the server is further adapted to, if the media item fails the license verification, move the media item into a separate holding area for subsequent license verification, and notify the first peer device that sent the recommendation of a license verification failure.

* * * * *